Oct. 13, 1970   J. H. ANDERSON   3,533,266
PIPE BENDER
Filed July 2, 1968   3 Sheets-Sheet 1

INVENTOR.
JAMES HILBERT ANDERSON
BY
*Kenyon, Palmer & Estabrook*
ATTORNEYS

Oct. 13, 1970   J. H. ANDERSON   3,533,266
PIPE BENDER
Filed July 2, 1968   3 Sheets-Sheet 2

INVENTOR
JAMES HILBERT ANDERSON
BY
Kemon, Palmer & Estabrook
ATTORNEYS

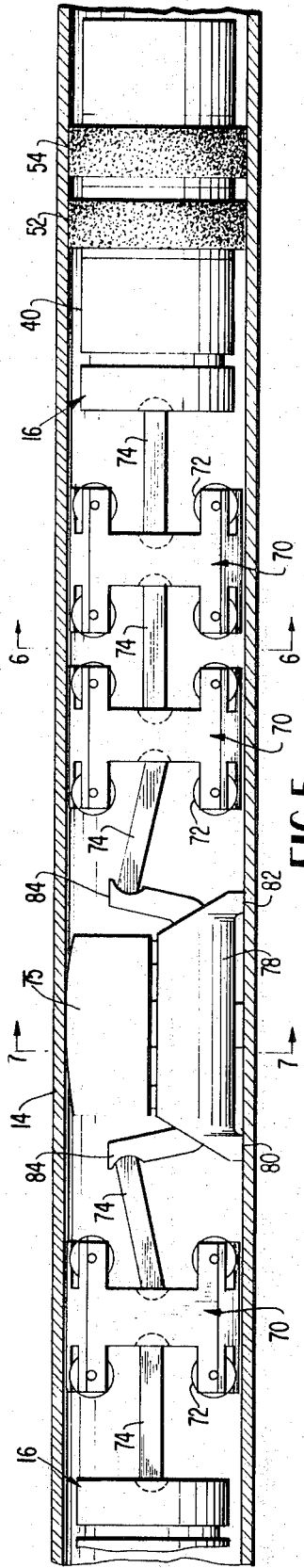
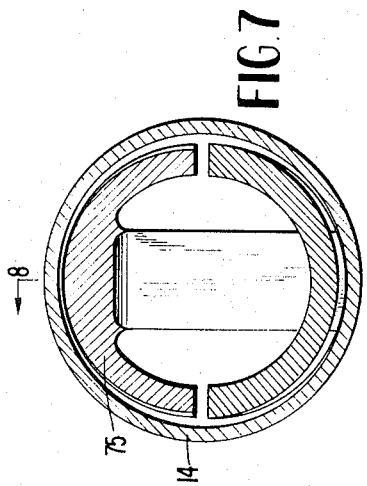
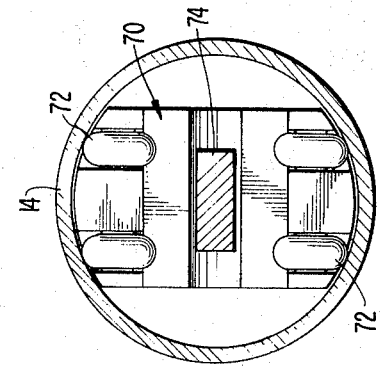
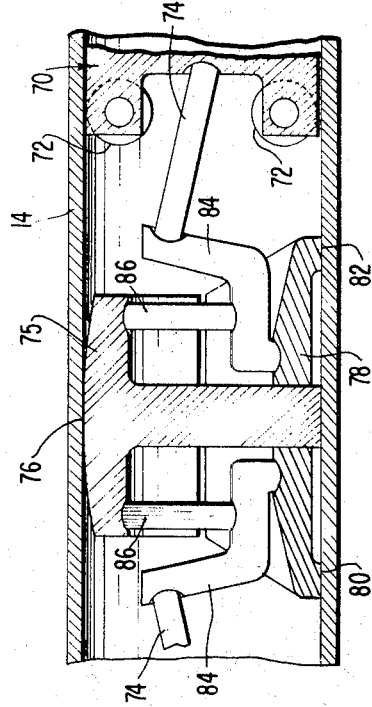

United States Patent Office 3,533,266
Patented Oct. 13, 1970

3,533,266
PIPE BENDER
James H. Anderson, 1615 Hillock Lane,
York, Pa. 17403
Filed July 2, 1968, Ser. No. 741,993
Int. Cl. B21d 9/00
U.S. Cl. 72—298    8 Claims

ABSTRACT OF THE DISCLOSURE

An apparatus for the bending of small diameter pipes is disclosed, which includes a pair of housings positioned within the pipe on opposite sides of the desired area of bend. Each housing includes fluid pressure actuated friction shoes for anchoring the housing to the wall of the pipe and a fluid pressure actuated piston which is designed to react against a bending disc positioned midway between the housings. An auxiliary bending moment may be supplied by an externally mounted piston and cylinder assembly supported by straps on either side of the location of the bending disc.

BACKGROUND OF THE INVENTION

Internal pipe benders are known and examples may be found in my prior Pat. No. 3,274,817 and in my copending application Ser. No. 532,903, filed Mar. 9, 1966, now Pat. No. 3,382,698. In attempting to extend the basic teaching of these prior inventions to pipes of various sizes, it has been found more difficult to design benders of this general type for smaller sizes of pipe than for larger sizes. There is a fundamental reason for this difficulty and that is the smaller the pipe size, the thicker is the walled section in relation to the pipe diameter. By way of specific example, the wall area in a four inch standard pipe is 3.17 square inches and the inside area is 12.73 square inches so that the metal wall area is 24.9% of the inside area. In a 30-inch schedule 10 pipe, however, the wall metal area is 29.1 square inches while the inside area is 678 square inches corresponding to a metal area of only 4.3% of the inside area. In terms of the pressure necessary to bend these two pipes, it has been found that it will take approximately 5.8 times as much pressure to bend the 4-inch pipe as it takes to bend the 30-inch pipe. With this background, the following description relates to an adaptation of the basic principles of my prior patent and application to a structure which while useful for bending all sizes of pipe, nevertheless finds particular utility in the bending of smaller sizes of pipe, for example, of the order of four inches.

BRIEF SUMMARY OF THE INVENTION

In general, the basic teachings of my prior patent and application are extended to an internal pipe bender for small diameter pipes by the following arrangement. A pair of housings, each including fluid pressure actuated friction shoes, are arranged within the pipe and spaced axially from one another. Each such housing also includes an axially slidable piston assembly. The two housings are positioned within the pipe in spaced axial relation and with the active ends of the pistons facing each other. Positioned substantially midway between the opposing faces of the pistons is a bending member linked to the two pistons by a pair of toggle members which are preferably positioned at a slight angle with respect to the common center line of the two pistons. With the housings rigidly anchored to the interior of the pipe, application of fluid pressure to the back sides of the piston assemblies results in movement of the two pistons toward each other and the reaction through the toggle linkage in the bending member is such that the entire section of the pipe lying between the two friction shoes is placed in axial tension. At the same time the bending member is urged radially outwardly which, course, results in a bending moment of the pipe at the location of the bending member. The bending moment may be supplemented by means of a further piston assembly positioned exteriorly of the pipe, in the same plane as the bending member and supported between the exterior of the pipe and a point spaced radially outwardly therefrom by a pair of axially spaced strap members which surround the pipe and are connected at the piston assembly supporting ends by a cross member.

BRIEF DESCRIPTION OF THE DRAWINGS

FIG. 5 is a side elevation partially in section showing an alternative embodiment of the apparatus shown in FIG. 1;

FIGS. 6 and 7 are sectional views on the lines 6—6 and 7—7, respectively, of FIG. 5; and FIG. 8 is a sectional view on the lines 8—8 of FIG. 7.

DETAILED DESCRIPTION

Figure 1:
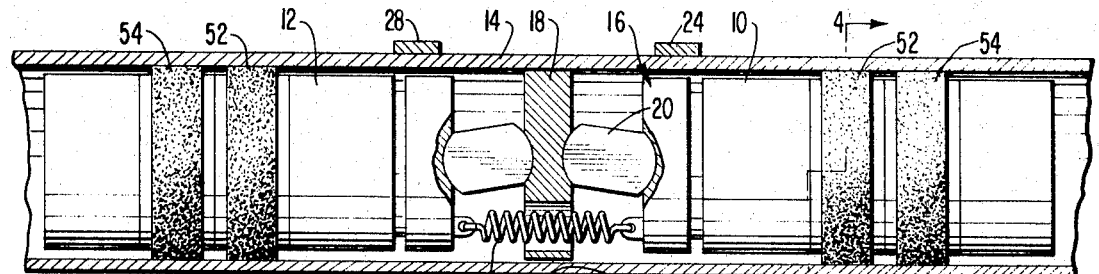
FIG. 1 is a side elevation partially in section of an apparatus in accordance with the present invention and prior to the application of bending pressure.
Figure 2:
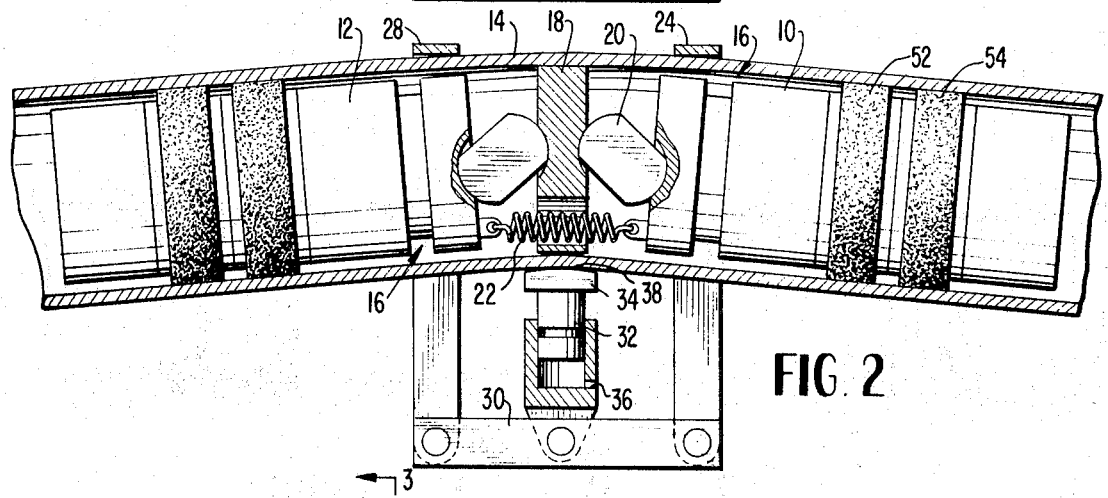
FIG. 2 is a view similar to FIG. 1 after the application of bending pressure and showing the pipe in slightly bent form.
Figure 4:
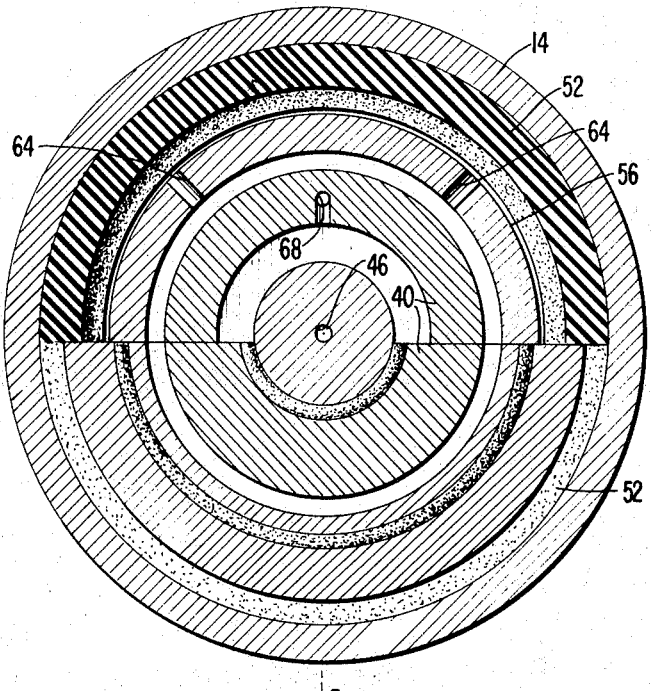
FIG. 4 is a section on the lines 4—4 of FIG. 1.

Referring first to FIGS. 1 and 2 of the attached drawings, a pair of identical housings 10 and 12 are positioned within the pipe 14 and spaced axially from each other. Since the housings are in fact identical, only one will be described. The housing 10 carries an axially movable piston 16 and it will be understood that the other housing carries an identical piston. Positioned substantially midway between the two pistons is a bending disc 18 and interposed between the bending disc 18 and the piston 16 is a toggle link 20, the center line of which lies at a small angle with respect to the center line of the piston 16. The two pistons are normally biased toward each other by one or more springs 22 and the pistons and toggle members are therefore held in the relationship shown in this figure. The housing 10 also includes fluid pressure actuated friction shoes for anchoring the housing within the pipe 14 and these will be described in detail hereinafter. With both housings anchored in the pipe, when fluid pressure is applied to the rear side of the piston 16, it and its companion piston will move toward each other and due to the reaction therebetween through the toggle structure, the pipe is placed in axial tension between the friction shoes. In addition, and due to the angular disposition of the toggle linkage, there is also a radially outward component of force applied to the bending disc 18 which is transmitted to the interior wall of the pipe at the upper portion thereof as viewed in FIG. 1. This results in a bending moment being applied to the pipe at the same time that it is placed in axial tension and the result is that the pipe begins to bend about the bending disc as shown most clearly in FIG. 2.

The apparatus shown in FIGS. 1 and 2 may include a device mounted externally of the pipe for increasing the bending moment about the bending disc 18. This device includes a pair of straps 24 and 28 which surround the pipe 14 and are connected at one end by a cross member 30. Positioned between the cross member 30 and the exterior of the pipe at the location of the bending disc 18 is a piston and cylinder assembly including a cylinder 32 and a piston 34. The cylinder 32 is supported on the cross member 30 and includes a fluid inlet port 36. The pipe contacting surface of the piston 34 is preferably convexly curved or saddle shaped as shown at 38 to facilitate bending of the pipe without scarring or wrinkling.

Figure 3:
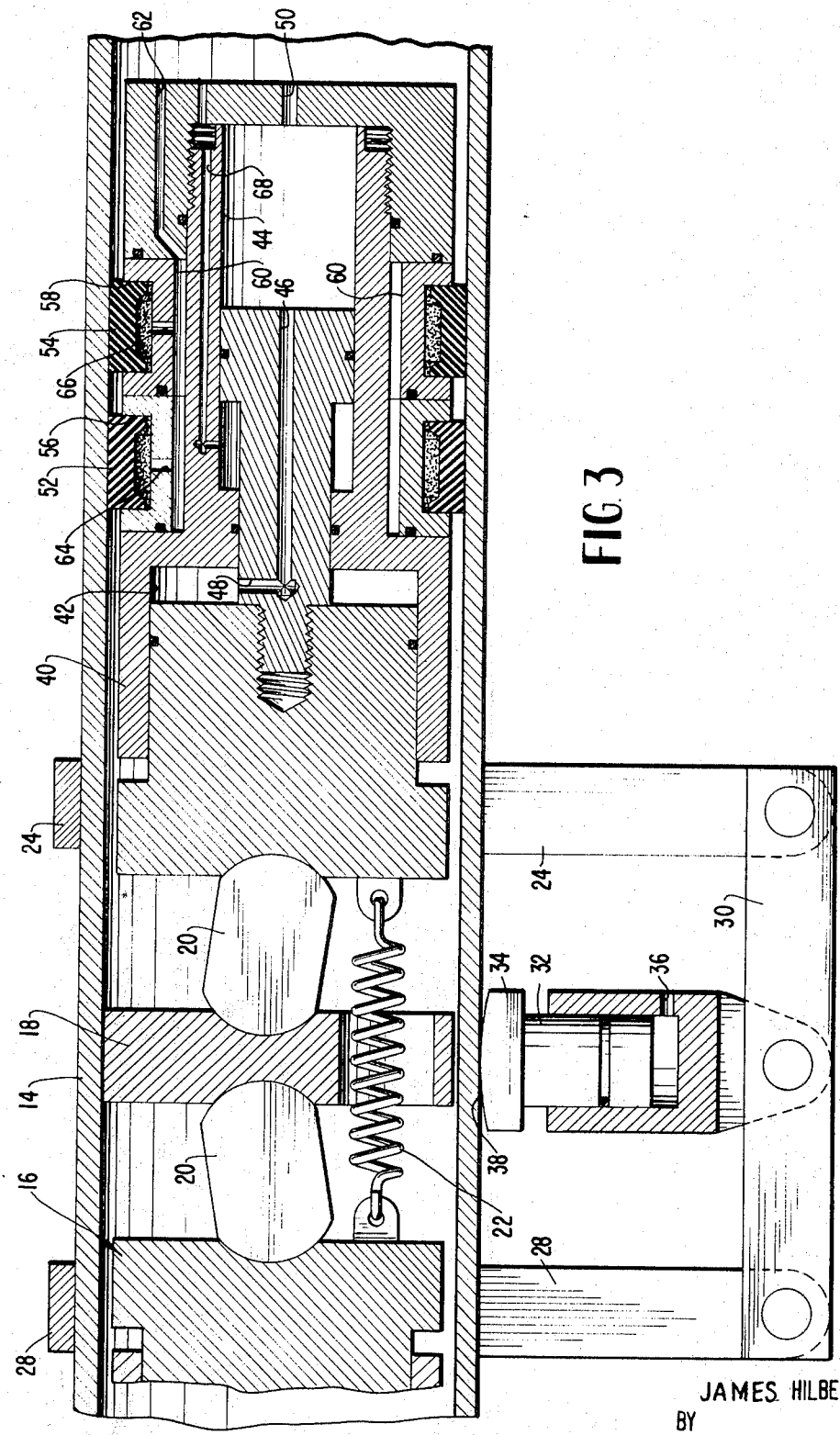
FIG. 3 is an enlarged side elevation of a portion of the apparatus shown in FIG. 1 detailing the piston assembly and pressure chambers.

Referring now to FIG. 3 for a detailed description of one of the housings and its fluid pressure actuated assemblies, it will be seen that the housing 40 has a pair of bores 42 and 44 which slidably receive the piston assembly 16. The piston 16 includes a large end slidably received in the bore 42 and a small end slidably received in the bore 44. The small end of the piston assembly 16 include a centrally located fluid passageway 46 and a passageway 48 transverse to and communicating with passageway 46 so that fluid pressure admitted into the bore 44 behind the small end of the piston 16 is also transmitted to the bore 42 at the rear of the large end of the piston 16. Admission of fluid pressure through the inlet 50 is therefore effective to move the piston assembly 16 to the left as viewed in this figure.

The housing 40 also includes axially spaced friction shoes shown at 52 and 54. Each of the shoes 52 and 54 are in effect flexible ring elements which are slidably received within grooves 56 and 58. The latter members also function as pistons and are slidably received in side by side relationship in an annular groove 60 formed in the outer surface of the housing 40. Fluid pressure for actuating the friction shoes is admitted to the area behind the rings 56 and 58 through passageway 62 and this same pressure is transmitted to the underside of flexible rings 52 and 54 through passageways 64 and 66 formed in cylinders 56 and 58, respectively.

The piston assembly 16 may be retracted or moved to the right, as shown in FIG. 3, by the application of fluid pressure through the passageway 68 to the bore 44 on the left side of the small end of the piston 16.

FIGS. 5 to 8, inclusive, show a modification of the apparatus shown in the preceding figures which is useful for bending pipes through large angles, for example, of the order of 90 degrees. The housing, piston, assembly and friction shoes shown in this figure is, of course, identical with the one described with reference to FIG. 3 In order to transmit the force of the piston through a greater distance to a toggle arrangement for producing the necessary bending moment, one or more trolley members 70 may be utilized. As shown most clearly in FIGS. 5 and 6, each trolley member 70 includes eight wheele or rollers 72 which ride on the inner wall of the pipe. Additional linkages such as 74 interconnect the piston assembly, the trolley members and the bending moment producing apparatus. It is contemplated that these assemblies will be maintained in the relation shown by one or more springs such as the spring 22 illustrated in FIGS. 1 to 3, inclusive.

FIGS. 7 and 8 show one possible structure for deriving a bending moment from the axial movement of the oppositely disposed piston assemblies 16. This device includes an outer bending shoe 75 for exerting an outwardly directed force against the interior of the wall of the pipe at the point 76. Slidably mounted on the leg of the outer bending shoe 75 is an inner bending shoe 78 which exerts a force radially outwardly against the interior of the wall of the pipe at the points 80 and 82. This force is directly opposed to that generated by shoe 75. The outer and inner bending shoes will be forced away from each other in response to fluid pressure applied to the rear of the piston assembly 16 by force transmitted through the linkages 74 and the trolleys 70 acting against the bell crank lever 84 which pivots on the inner bending shoe 75 and reacts directly against the pushrod 86. Obviously other compound linkage arrangements are possible.

From the foregoing it will be apparent to those skilled in this art that there is herein shown and disclosed a new and useful pipe bending apparatus. While preferred embodiments have been herein shown and described, applicant nevertheless claims the benefit of a full range of equivalents within the scope of the appended claims.

What is claimed is:
1. Apparatus for bending a tubular structure comprising:
  (a) a pair of housings positioned within a tubular structure in axially spaced relation to one another, each of said housings defining a cylinder for and containing a piston, said pistons facing each other, and having their longitudinal axes substantially coincident, and being axially movable on their longitudinal axes toward and away from each other;
  (b) means for locking said housings to the interior surface of the tubular structure;
  (c) a bending member within the tubular structure and positioned substantially midway between said housings;
  (d) a pair of toggles, one for transmitting force from each piston to said bending member respectively, at least one of said toggles having its longitudinal axis at an acuate angle to the common longitudinal axis of said pistons;
  (e) and fluid pressure means for urging said pistons toward each other while said housings are locked to the interior surface of said tubular structure thereby placing that portion of the tubular structure between the anchoring points of said housing in axial tension and forcing said bending member into engagement with a portion of the inner surface of the axially stressed tubular structure to effect a bending thereof.

2. Apparatus as defined by claim 1 in which said toggles are straight links, each angularly disposed with respect to a common center line through said pistons.

3. Apparatus as defined by claim 1 including means connected between said pistons and biasing said pistons toward each other maintain contact between said pistons, said toggles and said bending member.

4. Apparatus as defined by claim 1 including means external to the tubular structure for exerting an additional bending moment in the tubular structure about said bending member.

5. Apparatus as defined by claim 4 in which said means compirses:
  (a) strap members surrounding the tubular structure at points spaced axially on opposite sides of said bending member;
  (b) and a piston and cylinder assembly supported by said straps and positioned between one end thereof and the exterior of the tubular structure at the location of said bending disc.

6. Apparatus as defined by claim 5 in which the surface of said piston and cylinder assembly which engages the exterior of the tubular structure is convexly curved, or saddle shaped.

7. Apparatus as defined by claim 1 including at least one wheeled trolley member positioned within the tubular structure between each said piston and its associated toggle and a further toggle spacing each trolley member from its associated piston.

8. Apparatus as defined by claim 1 in which said bending member comprises:
- a first bending shoe having a convexly curved surface to engage the interior of the tubular structure in the area of the intended bend;
- a second bending shoe slidably mounted on said first shoe to engage the interior of the tubular structure at axially spaced points substantially 180° removed from the area of contact of said first shoe; and
- means engaging said toggle for urging said shoes into engaement with the interior of the tubular structure in response to force transmitted to said bending members through said toggles.

References Cited

UNITED STATES PATENTS

| | | | |
|---|---|---|---|
| 3,043,361 | 7/1962 | Kelso | 72—466 |
| 3,274,817 | 9/1966 | Anderson | 72—298 |
| 3,382,698 | 5/1968 | Anderson | 72—298 |

LOWELL A. LARSON, Primary Examiner

U.S. Cl. X.R.

72—465